United States Patent
Liskov et al.

(10) Patent No.: US 6,411,715 B1
(45) Date of Patent: Jun. 25, 2002

(54) METHODS AND APPARATUS FOR VERIFYING THE CRYPTOGRAPHIC SECURITY OF A SELECTED PRIVATE AND PUBLIC KEY PAIR WITHOUT KNOWING THE PRIVATE KEY

(75) Inventors: Moses Liskov, Waltham; Robert Silverman, Chelmsford; Ari Juels, Cambridge, all of MA (US)

(73) Assignee: RSA Security, Inc., Bedford, MA (US)

( * ) Notice: Subject to any disclaimer, the term of this patent is extended or adjusted under 35 U.S.C. 154(b) by 0 days.

(21) Appl. No.: 09/188,963

(22) Filed: Nov. 10, 1998

Related U.S. Application Data

(60) Provisional application No. 60/065,053, filed on Nov. 10, 1997.

(51) Int. Cl.[7] .............................. H04L 9/08; H04L 9/28; H04L 9/30
(52) U.S. Cl. .......................... 380/277; 380/28; 380/30; 380/286; 380/1; 713/171
(58) Field of Search ................................. 380/1, 28, 30, 380/44, 46, 277, 278, 283, 285, 286; 713/171

(56) References Cited

U.S. PATENT DOCUMENTS

| | | | |
|---|---|---|---|
| 4,200,770 A | 4/1980 | Hellman et al. | 178/22 |
| 4,218,582 A | 8/1980 | Hellman et al. | 178/22 |
| 4,376,299 A | 3/1983 | Rivest | 364/900 |
| 4,405,829 A | 9/1983 | Rivest et al. | 178/22.1 |
| 4,691,299 A | 9/1987 | Rivest et al. | 365/189 |
| 5,272,755 A | 12/1993 | Miyaji et al. | 380/30 |
| 5,351,297 A | 9/1994 | Miyaji et al. | 380/28 |
| 5,606,617 A * | 2/1997 | Brands | 380/30 |
| 5,768,388 A * | 6/1998 | Goldwasser et al. | 380/30 |

OTHER PUBLICATIONS

Brands, S., "Rapid Demonstration of Linear Relations Connected by Boolean Operators," EuroCrypt '97, Springer–Verlag, 1997, pp. 318–333.*

Blackburn et al., "Certification of Secure RSA Keys", *Dept. of Mathematics*, Royal Holloway, University of London Egham, Surrey, pp. 1–11, Aug. 20, 1998.

Damgard, "Practical and Provably Secure Release of a Secret and Exchange of Signatures", *Aarkas University*, Mathematical Institute, pp. 201–217.

Gennaro et al., "An Efficient Non–Interactive Statistical Zero–Knowledge Proof System for Quasi–Safe Prime Products".

Mao, "Verifiable Partial Sharing of the Factors of an Integer", *Hewlett–Packard Laboratories*, pp. 95–110.

* cited by examiner

Primary Examiner—Gilberto Barron, Jr.
Assistant Examiner—Justin T. Darrow
(74) Attorney, Agent, or Firm—Testa, Hurwitz &Thibeault, LLP

(57) ABSTRACT

Methods and apparatus are disclosed for demonstrating that a public/private key pair is cryptographically strong without revealing information sufficient to compromise the private key. A key pair can be shown to be cryptographically strong by demonstrating that its modulus N is the product of two relatively large prime numbers. In addition, a key pair can be shown to be cryptographically strong by demonstrating that N is cryptographically strong against Pollard factoring attacks, Williams factoring attacks, Bach-Shallit factoring attacks, and weighted difference of squares factoring attacks.

90 Claims, 6 Drawing Sheets

METHODS AND APPARATUS FOR VERIFYING THE CRYPTOGRAPHIC SECURITY OF A SELECTED PRIVATE AND PUBLIC KEY PAIR WITHOUT KNOWING THE PRIVATE KEY

RELATED APPLICATIONS

This Application claims benefit of U.S. Provisional Application No. 60/065,053, filed Nov. 10, 1997.

FIELD OF THE INVENTION

This invention relates to cryptographic communications methods and systems that use a public key protocol, and more particularly to verifying the cryptographic security of a selected public and private key pair without knowing the private key.

BACKGROUND OF THE INVENTION

Cryptographic systems are adapted to transfer securely messages between remote locations over unsecured communication networks. Such systems include at least one encoding device at a first location and at least one decoding device at a second location, with the encoding and decoding devices all being coupled to the network. The encoding device accepts, as inputs, a message-to-be-encoded (M) and an encoding key or encryption operator (E). The encoding device transforms the message M in accordance with the encryption operator to produce an encoded version (C) of the message (which is denoted as the ciphertext), where C=E(M). The decoding device accepts, as inputs, a ciphertext-to-be-decoded C and a decoding key or operator (D). The decoding device transforms the ciphertext in accordance with the decryption operator to produce a decoded version (M') of the ciphertext, wherein M'=D(C) or M'=D(E(M)) and M'=M for all messages. Like the encoding key, the decoding key and decoded message M' are digital sequences.

In a public-key cryptosystem, each user (e.g., user A) publishes an enciphering operator, or a public key, $E_A$. User A keeps private the details of the corresponding deciphering private key $D_A$ which satisfies the equation $D_A(E_A(M))=M$ for any message M. In order for the public key system to be practical, both $E_A$ and $D_A$ must be efficiently computable. Furthermore, user A must not compromise the cryptographic security of $D_A$ when revealing $E_A$. That is, it should not be computationally feasible for an eavesdropper to find an efficient way of computing $D_A$ given only a specification of the enciphering key $E_A$. In a public key system, a cryptographically secure selection of keys ensures that only user A is able to compute $D_A$ efficiently. Whenever another user (e.g., user B) wishes to send a message M to A, that user encodes M using the publicly-available $E_A$ and then sends the enciphered message $E_A(M)$ to user A. User A deciphers the message by computing $(D_A(E_A(M))=M$. Since $D_A$ is not derivable from $E_A$ in a practical way, only user A can decipher the message $E_A(M)$. If user A wants to send a response to user B, user A enciphers the message using user B's encryption key $E_B$, also available in publicly.

The public key approach is also used to provide signed digital messages that are both message-dependent and signer-dependent. The recipient of a "signed" message not only knows the message substance, but is also assured that the message originated from the identified sender. A signed message precludes the possibility that a recipient could modify the received message by changing a few characters or that the recipient could attach the received signature to any message whatsoever.

When user A wants to send user B a "signed" document M, user A first uses his own decryption key $D_A$ to transform M into a signed message word $M_s$, where $M_s=D_A(M)$. User A then uses user B's publicly-available encryption key $E_B$ to generate a signed ciphertext word $C_S=E_B(M_S)=E_B(D_A(M))$, which is sent to user B. User B initially uses his secret decryption key $D_B$ to reduce the signed ciphertext $C_S$ to a signed message word in accordance with $D_B(C_S)=D_B(E_B(M_S))=M_S$. Now using user A's publicly-available encoding key $E_A$, user B decodes the signed message word in accordance With $E_A(M_S)=E_A=M$. User A cannot deny having sent user B this message, since no one but A could have created $M_S=D_A(M)$, provided that $D_A$ is not Computable from $E_A$, i.e. provided that $D_A$ is cryptographically secure. Furthermore, user B can show that the public key $E_A$ is necessary to extract the message M so that user B has "proof" that user A has signed the document. User B cannot modify M to a different version M', since then user B would have to create the corresponding signature $D_A(M')$ as well. Therefore user B must have received a document "signed" by A, which he can "prove" that A sent, but which B cannot modify in any detail.

In a communication system which is adapted to pro)vide digital signatures, each transmitting and receiving terminal is provided with both an encoding and decoding device, each device being functionally equivalent to the devices described above but operating on a different set of input words with a different key. The transmitting terminal decoding device transforms a message M using its own decoding key to generate a signed message $M_S$. Then the encoding device transforms the resultant signed message $M_S$ with the intended receiving terminal's encoding key to generate signed ciphertext word $C_S$. The receiving terminal's decoding device then transforms the received $C_S$ with its own decoding key to obtain the signed message $M_S$, and then the encoding device transforms the resultant signed message with the transmitting terminal's encoding key to obtain the original message. For example, in a system for transmitting signed messages from user A to user B, the terminal for user A includes at least one encoding device characterized by an encoding key $E_B=(e_B, N_B)$ and at least one decoding device, characterized by a decoding key $D_A=(d_A, N_A)$. Similarly, the terminal for user B includes an encoding device characterized by an encoding key $E_A=(e_A, N_A)$ and a decoding device characterized by a decoding key $D_B=(d_B, N_B)$. The encoding and decoding devices of terminals A and B are described above.

In operation, to provide a signed message, user A first generates a ciphertext signed message word $M_S$ $$M_s=M^{d_A}(\text{mod } N_A)$$

and then transforms that signed message word to a signed ciphertext word $C_S$: which is then transferred to user B. User A may readily use $D_A$ and $N_A$ from his own $$C_S=M_S^{e_B}(\text{mod } N_B)$$

decoding key to reduce the signed ciphertext word to a signed message word, and then perform the encoding transformations using $E_B$ and $N_B$ from the publicly available file.

User B deciphers the received $C_S$ into the signed message word $M_S$ in accordance with $$M_S=(C_S)^{d_B}(\text{mod } N_B)$$

User B then transforms $M_S$ to M in accordance with $$M = M_S^{e_A} (\bmod N_A)$$

User B may readily perform his decoding transformations since $D_B$ and $N_B$ are part of his decoding key and $E_A$ and $N_A$ are readily available on the public file.

Because public key cryptography can be used for authentication of transactions, a cryptographically strong key pair (i.e. a public key and a corresponding private key) is desirable to prevent a party to a transaction from subsequently repudiating it. If a transaction is authenticated with a weak key pair, it is easier for a party to the transaction to subsequently repudiate it by arguing that the private key had succumbed to a cryptanalytic attack.

When business transactions are conducted over an unsecured network there is a critical need to assure the cryptographic security of the private key. The integrity of the transactions are assured not only by preventing an unauthorized party to decipher or alter the transmitted message, or by uniquely identifying the sender, but also by preventing the sender from repudiating the transaction later. That is, the author should be the constructor of the private key and the only party having access to the private key. On the other hand, a certifying authority (i.e., a verifier) should be able to verify the cryptographic security of the private key without receiving information sufficient to calculate the private key. In a certifying process, the constructor (i.e., the prover) would prove the cryptographic security of the selected private key to the verifier while interacting over the unsecured network. Certification authorities validate key pairs. This validation usually involves the assumption of liability. It is desirable for a certification authority to verify the cryptographic security of a key pair before validating it and thus assuming liability on its behalf.

The best known factoring algorithms which can be used for cryptanalytic attacks are the Elliptic Curve Method (ECM), the Quadratic Sieve (QS), and the Number Field Sieve (NFS). The computational run-time required by the Number Field Sieve does not depend on the size of the factors. The Number Field Sieve is described in Lenstra, A. K., and Lenstra, Jr., H. W., eds., Lecture Notes in Mathematics 1554: *The Development of the Number Field Sieve*, Springer-Verlag, 1993. The run-time necessary for ECM to find a factor p of a larger integer N depends on the size of p. Finding factors greater than 60 decimal digits is regarded as impractical with current computer technology. To make the factoring of N as difficult as possible means making p too large for ECM. This is accomplished by taking p to be just slightly smaller than $\sqrt{N}$.

Two other cryptanalytic attacks known in the art are the Pollard P−1 factoring algorithm and the Williams P+1 factoring algorithm. These algorithms can succeed in factoring N=pq if either p±1 or q±1 has only small prime factors. To make the factoring of N as difficult as possible means selecting p and q such that p−1, p+1, q−1, and q+1 all have large prime factors.

Another cryptanalytic attack is described in E. Bach & J. Shallit, *Factoring with Cyclotomic Polynomials*, Math. Comp. 52 (1989), 201–219. The Bach-Shallit algorithm can succeed in factoring N=pq if cyclotomic polynomials in either p or q have only small prime factors. To make the factoring of N as difficult as possible means selecting p and q such that cyclotomic polynomials in p and q all have large prime factors.

Another cryptanalytic attack is the weighted difference of squares algorithm. This algorithm can succeed in factoring N=pq if p and q are too close together, which allows N to be represented as $x^2 - y^2$. To make the factoring of N as difficult as possible means selecting p and q such that the ratio p/q is not approximated by a ratio a/b, where a and b are two reasonably small integers.

As can be seen from above, the underlying cryptographic security of the public key cryptographic protocols rests upon the difficulty of factoring large composite integers. The systems and methods described herein enable an entity to prove to a verifying entity that the constructed private key is cryptographically secure without revealing sufficient information to factor the private key.

SUMMARY OF THE INVENTION

In one aspect, this invention provides methods and systems for demonstrating that a number N is the product of two large prime factors without revealing any information about its factors.

In another aspect, this invention provides methods and systems for demonstrating that a number N is resistant to Pollard P−1 factoring attacks without revealing any information about its factors. In yet another aspect, this invention provides methods and systems for demonstrating that a number N is resistant to Williams P+1 factoring attacks without revealing any information about its factors.

In another aspect, this invention provides methods and systems for demonstrating that a number N is resistant to Bach-Shallit cyclotomic polynomial factoring attacks without revealing any information about its factors.

In another aspect, this invention provides methods and systems for demonstrating that a number N is resistant to weighted difference of squares factoring attacks without revealing any information about its factors.

DETAILED DESCRIPTION OF PREFERRED EMBODIMENTS

Overview

Figure 1:
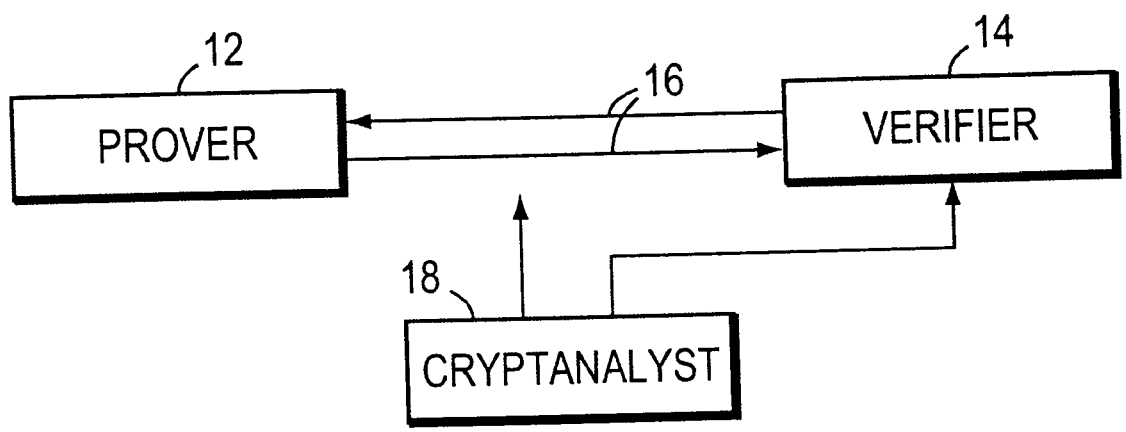
FIG. 1 is a flow chart illustrating a protocol for executing a proof protocol over an open channel.

There are several public key cryptographic protocols. The Diffie-Hellman cryptographic protocol was described in U.S. Pat. Nos. 4,200,770 and 4,218,582. As summarized in U.S. Pat. No. 5,313,521, the Diffie-Hellman protocol uses a prime number p and an integer a that is between 0 and p−1. For user A and user B to obtain a shared secret number, user A randomly generates a secret number $X_A$ and computes a corresponding public number $Y_A$, where $Y_A = a^{X_A} \bmod p$. User B also randomgly generates a secret number $X_B$ and computes a corresponding public number $Y_B$, where $Y_B = a^{X_B} \bmod p$. When p is large, it is computationally infeasible to obtain the secret numbers from the public numbers.

User A and user B publish only their non-secret public numbers $Y_A$ and $Y_B$. By the commutative property, user A computes $$E = Y_B^{X_A} \mod p$$

while user B computes the same number by $$E = Y_A^{X_B} \mod p.$$

The RSA communication system also uses the public key protocol, wherein each user has at least one encoding device and at least one decoding device. The encoding device is responsive to an applied message-to-be-transmitted (M) and an encoding key to provide a ciphertext word (C) for transmission to a particular decoding device. The encoding key (E) is a pair of positive integers e and N, which are related to the particular decoding device. The message M is a number representative of a message-to-be-transmitted and is in the range:

$$1 < M \leq N-1$$

where N is a composite number of the form $$N = p \cdot q$$

where p and q are odd prime numbers.

For messages represented by numbers outside the range 0 to N−1, a conventional blocking means is utilized to break the message into message block words before encoding, where each block word is representative of a number within the specified range. Following subsequent decoding, the recovered block words may be transformed back to the original message.

The transformation provided by the encoding device is described by the relation $$C \equiv M^e (\mod N)$$

where e is a number relatively prime to (p−1)·(q−1).

The particular decoding device is also coupled to the channel and is adapted to receive the ciphertext C from the channel. The decoding device is responsive to the received ciphertext word C and a decoding key to transform that ciphertext to a received message word M'. The decoding key D is a pair of positive integers d and N. M' is a number representative of a deciphered form of C (i.e. reconstituted plaintext) and corresponds to the relation $$M' \equiv C^d (\mod N)$$

where d is a multiplicative inverse of e modulo the least common multiple of p−1 and q−1 so that $$e \cdot d \equiv 1 \mod(lcm((p-1),(q-1)))$$

where lcm((p−1), (q−1)) is the least common multiple of p−1 and q−1.

With these encoding and decoding devices, a message sent from the encoding device to the decoding device is transformed from M to C by the encoding device, and then back from C to M' by the decoding device, where M'=M (mod N).

The invention also applies to public key cryptographic protocols with elliptic curves as described by Victor Miller in "Uses of Elliptic Curves in Cryptography", Advances in Cryptology, Crypto '85, pages 417–426, or in U.S. Pat. Nos. 5,272,755 and 5,351,297.

In a preferred embodiment of the invention, a prover generates a key pair and wishes to demonstrate to a verifier the cryptographic strength of the key pair without revealing any information about the key pair's private key.

There are several aspects of cryptographic strength that the prover may wish to demonstrate. First, the prover may wish to demonstrate that an integer N, which is the product of prime numbers p and q, is difficult to factor. Specifically, the prover may wish to demonstrate that the factors p and q are two large, nearly equal primes. Second, the prover may wish to demonstrate that the prime factors p and q are resistant to Pollard and Williams factoring attacks. Specifically, the prover may wish to demonstrate that the numbers p±1 and q±1 have large prime factors. In a preferred embodiment, the prover may wish to demonstrate the key pair's compliance with the ANSI X9.31 and X9.44 standards by demonstrating that prime factors of p±1 and q+1 are greater than a security parameter. Third, the prover may wish to demonstrate that the prime factors p and q are resistant to Bach-Shallit factoring attacks. Specifically, the prover may wish to demonstrate that cyclotomic polynomials in p and q have large prime factors. Fourth, the prover may wish to demonstrate that the product N is resistant to a factoring attack which represents N as a weighted difference of squares. Specifically, the prover may wish to demonstrate that for any given small integers a and b, the size of |ap-bq| is large.

The protocols demonstrating these elements of cryptographic strength require that certain ancillary properties also be demonstrated. First, the prover will need to demonstrate from public information $g^a \mod S$, $g^b \mod S$, and $g^c \mod S$ that c=ab. (For the purposes of this invention, a very large prime number S, and a generator g of $(Z/SZ)^*$ are public information which may be known a priori by both the prover and the verifier.) Second, the prover will need to bound the size of b given $g^b \mod S$. Third, the prover will need to demonstrate that p is prime given $g^p \mod S$.

Referring now to FIG. 1, a system according to the present invention includes a proving node 12 (referred to throughout as a "proving node" or a "prover") and a verifying node 14 (referred to throughout as a "verifying node" or a "verifier"). The verifying node 14 and the proving node 12 communicate over a communications channel 16. Communications channel 16 may be any form of physical cabling or, alternatively, communications channel 16 may be a wireless communication medium such as a infrared. Further, communications channel 16 may support any of a number of communications protocols, including but not limited to Ethernet, IP, ATM, Frame Relay, X.25, or any other suitable communication protocols known in the art.

In one embodiment, a prover 12 and a verifier 14 may be special-purpose hardware designed and implemented specifically for the purpose of performing encryption and decryption functions. In another embodiment, a prover 12 and a verifier 14 may be implemented in smartcards and smartcard readers. In this embodiment, a smartcard generates a key pair and demonstrates that the key pair is cryptographically strong without revealing any information about the private key. A typical smart card is designed to be tamper-proof in order to defeat physical attacks on the information thereon, such as x-ray photography and power-use monitoring. In yet another embodiment, a prover 12 and a verifier 14 may be implemented in a handheld computing device such as a 3Com Palm Pilot. In yet another embodiment, a prover 12 and a verifier 14 may be implemented as a programmed general-purpose computer.

The computer can be any personal-type computer or workstation such as a PC or PC-compatible machine, an Apple Macintosh, a Sun workstation, etc. In general, any device could be used as long as it is able to perform all of the functions and capabilities described herein. The particular type of computer or workstation is not central to the invention.

Figure 2:
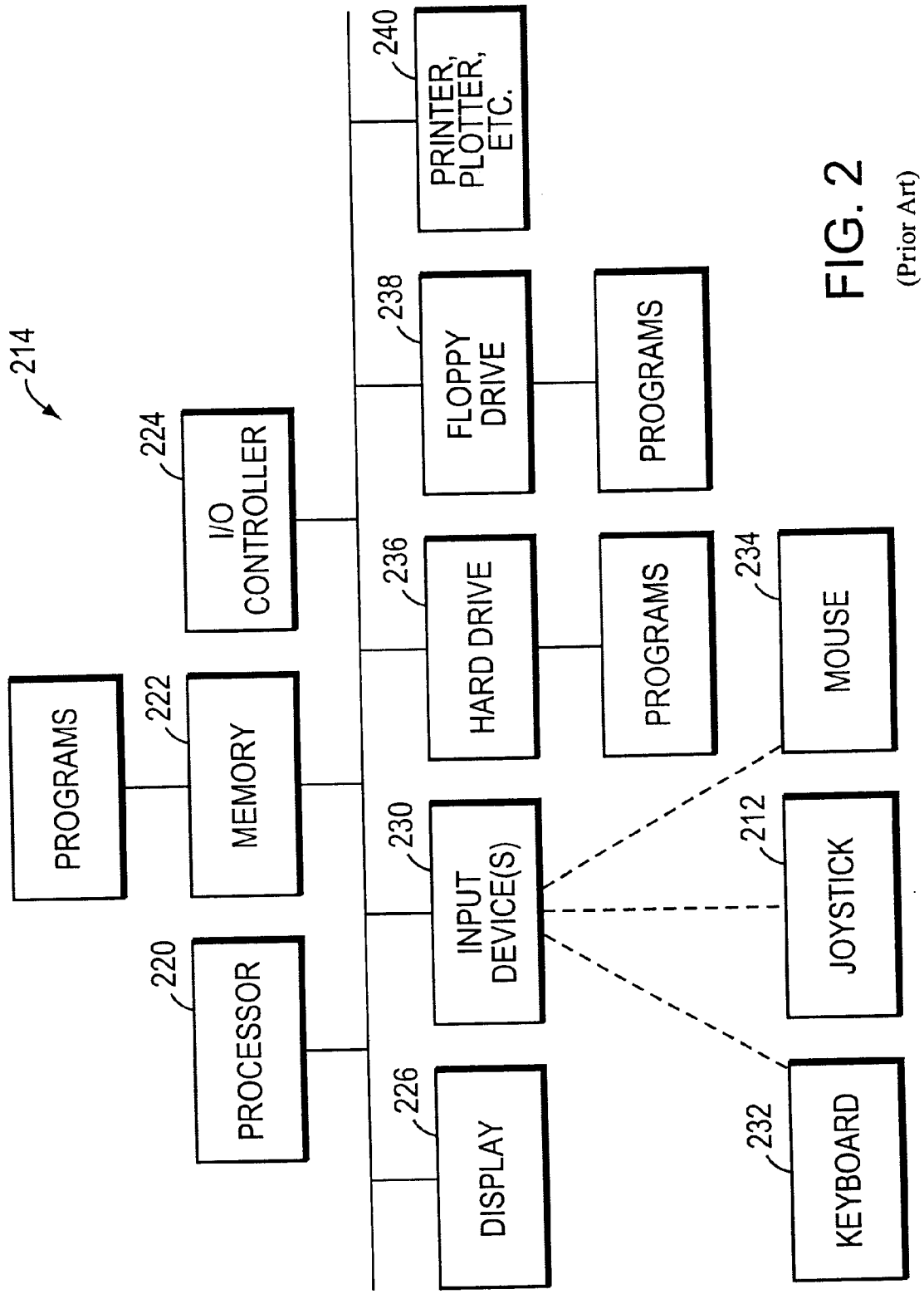
FIG. 2 is a diagram illustrating the components of a general purpose computer.

Referring to FIG. 2, the computer 214 typically will include a central processor 220, a main memory unit 222 for storing programs and/or data, an input/output (I/O) controller 224, a display device 226, and a data bus 228 coupling these components to allow communication therebetween. The memory 222 includes random access memory (RAM) and read only memory (ROM) chips. The computer 214 typically also has one or more input devices 230 such as a keyboard 232 (e.g., an alphanumeric keyboard and/or a musical keyboard), a mouse 234, and the joystick 212. In a preferred embodiment, the system 210 includes the single joystick 212, the alphanumeric keyboard 232, and the mouse 234.

The computer 214 typically also has a hard drive 236 with hard disks therein and a floppy drive 238 for receiving floppy disks such as 3.5 inch disks. Other devices 240 also can be part of the computer 214 including output devices (e.g., printer or plotter) and/or optical disk drives for receiving and reading digital data on a CD-ROM. In the disclosed embodiment, one or more computer programs define the operational capabilities of the system 210, as mentioned previously. These programs can be loaded onto the hard drive 236 and/or into the memory 222 of the computer 214 via the floppy drive 238. In general, the controlling software program(s) and all of the data utilized by the program(s) are stored on one or more of the computer's storage mediums such as the hard drive 236, CD-ROM 240, etc. In general, the programs implement the invention on the computer 214, and the programs either contain or access the data needed to implement all of the functionality of the invention on the computer 214.

Demonstrating that N is the Product of Two Large Primes

In one embodiment, a prover 12 has generated an RSA key pair and wishes to demonstrate its cryptographic strength to a verifier 14. The prover 12 wishes to demonstrate that N, which is a known component of the public key, is the product of two relatively large prime factors p and q without revealing any information about the prime factors p and q themselves.

The protocol of this embodiment, designated the two__large__prime__factors protocol for the purposes of this invention, allows the prover 12 to demonstrate this property. The protocol stems from Euler's theorem, which states that if an r and N are relatively prime—that is, their greatest common divisor is 1—and if $\phi(N)$ is the Euler totient function, $\phi(N)=(p-1)(q-1)=N-p-q+1$, then:

$$r^{\phi(N)} \equiv 1 \bmod N.$$

From Euler's theorem, it follows that:

$$r^{p+q} \equiv r^{N-1} \bmod N$$

where r and N are relatively prime.

In the protocol of this embodiment, r is a random variable drawn from a random distribution. In a preferred embodiment, this distribution is a uniform distribution. In a more preferred embodiment, this uniform distribution has a minimum of 2 and a maximum of N−1.

In one embodiment, the prover 12 and the verifier 14 agree upon an r. In an alternative embodiment, the verifier 14 may generate the r and send it to the prover 12.

For the purposes of this invention, when one party executing a protocol sends information to another party executing the protocol, it is viewed as the functional equivalent of publishing the information. Similarly, when one party executing a protocol publishes information, it is viewed as the functional equivalent sending the information to another party executing the protocol.

When determining the r, it must be checked to make sure that it is relatively prime to N. One of ordinary skill in the art will recognize that this can be accomplished by taking the gcd of r with N and verifying that the result is 1.

Figure 3:
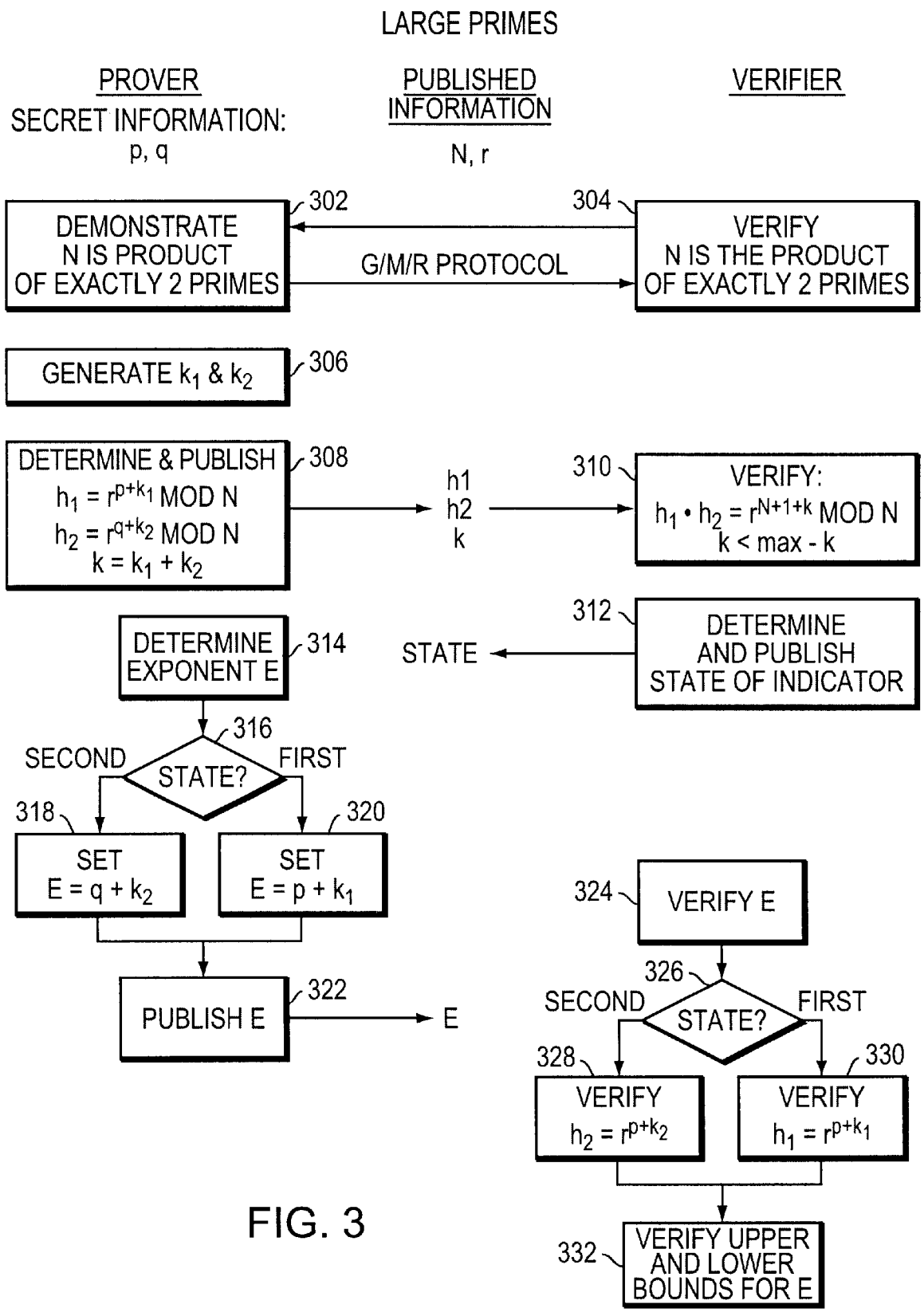
FIG. 3 is a flow chart illustrating a protocol for demonstrating that a number N is the product of two large primes.

Referring now to FIG. 3, the prover 12 and the verifier 14 next execute 302, 304 the Gennaro, Micciancio, & Rabin protocol to demonstrate that N is the product of exactly two primes. This protocol is described below.

The prover 12 then generates 306 two blinding numbers, k1 and k2. The blinding numbers are two independent random variables drawn from a random distribution. In a preferred embodiment, this distribution is a uniform distribution. In a more preferred embodiment, this uniform distribution has a minimum of 0 and a maximum of $N^{1/2}+\epsilon$, where $\epsilon$ is a very small positive number relative to 1.

The prover 12 then calculates 308 commitment numbers h1 and h2, where $h1=r^{p+k1} \bmod N$, and $h2=r^{q+k2} \bmod N$. The prover 12 also calculates 308 the sum $k=k1+k2$. The prover 12 then sends 308 h1, h2, and k to the verifier 14.

The verifier 14 then examines 310 h1, h2, , and k. Specifically, the verifier 14 verifies 310 that $h1 \times h2 = r^{N+1+k} \bmod N$, and that k is less than twice the maximum value of the random distribution from which k1 and k2 were drawn.

The verifier 14 then sends 312 the prover 12 an indicator with a randomly chosen state. This indicator can be in either a first or second state. In one embodiment, the first and second state are equally probable.

The prover 12 then sends 322 and exponent E to verifier 14. The value of E varies in response to the state of the indicator. If the indicator is in the first state, then E is set 320 to p+k1. If the indicator is in the second state, then E is set 318 to q+k2.

The verifier 14 then evaluates 324 E. Specifically, if the indicator is in the first state, the verifier 14 verifies 330 that $h1=r^{p+k1}$, and if the indicator is in the second state, the verifier 14 verifies 328 that $h2=r^{q+k2}$. The verifier 14 also verifies 332 that E is within an upper and lower bound. In one embodiment, the lower bound is $N^{1/2-\epsilon}$, and the upper bound is $2N^{1/2+\epsilon}$, where $\epsilon$ is a very small positive number relative to 1.

If any of the verifications are unsuccessful, the prover 12 has failed to demonstrate that N is the product of two large primes. If this outcome occurs, the verifier 14 may refuse to assume any liability on the behalf of the prover 12. In this case, the prover 12 may choose to generate another key pair for certification by the verifier 14.

Alternate Embodiment for Demonstrating that N is the Product of Two Large Primes In another embodiment of the invention, the r is selected in a manner similar to the previous embodiment. The prover 12 generates a random blinding number k in a manner similar to the previous embodiment. In this embodiment, k is a random variable drawn from a random distribution. In a preferred embodiment, this distribution is a uniform distribution. In a more preferred embodiment, this uniform distribution has a minimum of 0 and a maximum of $N^{1/4+\epsilon}$, where $\epsilon$ is a very small positive number relative to 1.

In this embodiment, the prover 12 generates $r^k$ and sends this number to the verifier 14.

The verifier 14 then generates a number m and sends it to the prover 12. In this embodiment, m is a random variable drawn from a random distribution. In a preferred embodiment, this distribution is a uniform distribution. In a more preferred embodiment, this uniform distribution has a minimum of 0 and a maximum of $N^{1/4+\epsilon}$, where $\epsilon$ is a very small positive number relative to 1.

The prover 12 then calculates p+q+(mk) and sends this result to the verifier 14. The verifier 14 then verifies that $r^{p+q+mk} \equiv r^{N+1}(r^k)^m \mod N$ and that $$0 < p+q+(mk) < 2N^{\frac{1}{2}+2\epsilon}.$$

Demonstrating Resistance to Pollard and Williams Factoring Attacks

In one embodiment, a prover 12 has generated an RSA key pair and wishes to demonstrate its cryptographic strength to a verifier 14. The prover 12 wishes to demonstrate that the prime factors of N—p and q—are resistant to Pollard P-1 factoring attack and the Willliams P+1 factoring attack. Specifically, the prover 12 wishes to demonstrate strength against the Pollard P-1 factoring attack by demonstrating that (p-1) and (q-1) have large prime factors. Similarly, the prover 12 wishes to demonstrate strength against the Williams P+1 factoring attack by demonstrating that (p+1) and (q+1) have large prime factors.

For the purposes of this invention, a very large prime number S, and a generator g of (Z/SZ)* are public information which are known by both the prover 12 and the verifier 14. In one embodiment, S and g are jointly generated by the prover 12 and the verifier 14.

Figure 4:
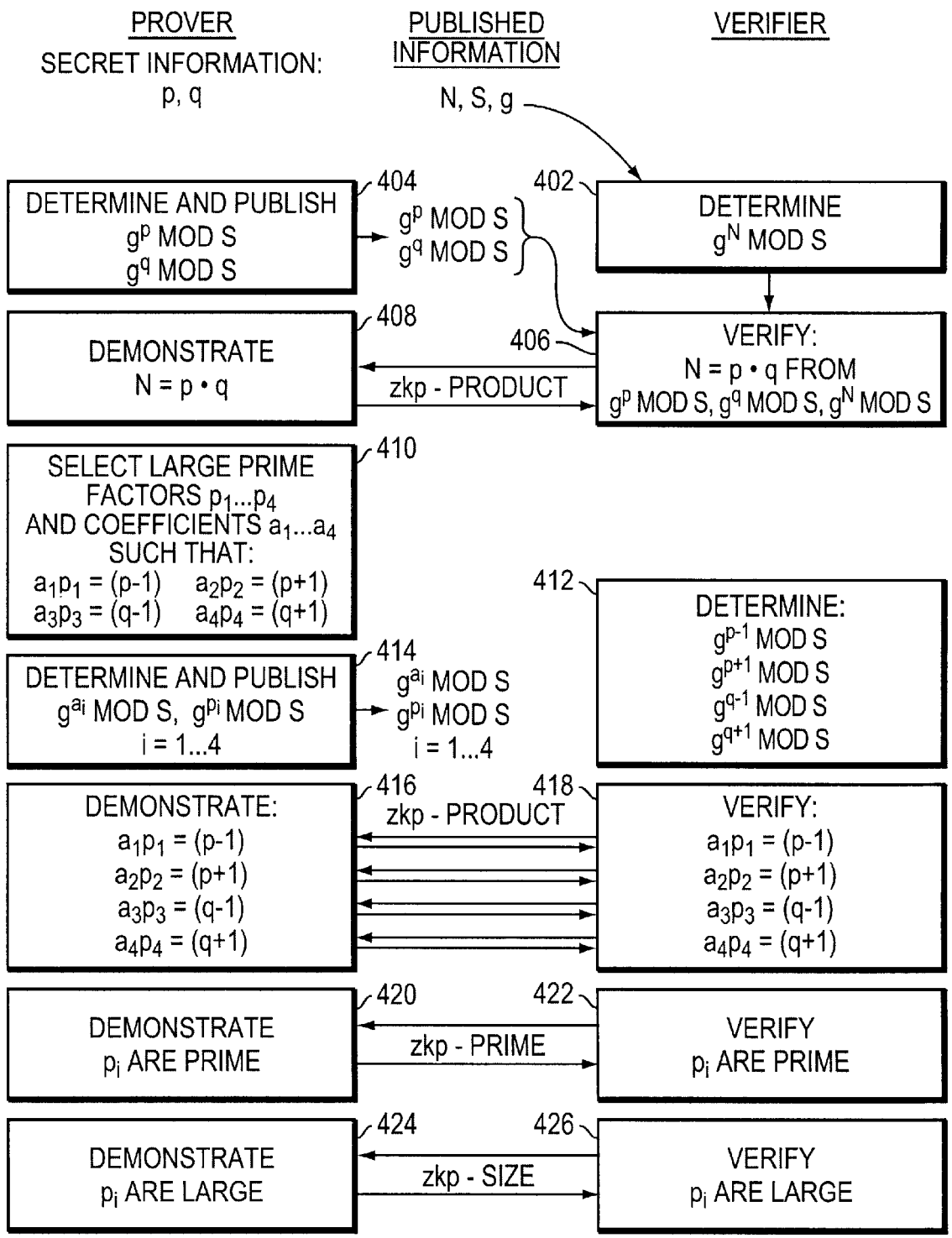
FIG. 4 is a flow chart illustrating a protocol for demonstrating that a number N is resistant to Pollard P−1 factoring attacks and Williams P+1 factoring attacks.

Referring now to FIG. 4, the prover 12 first publishes 404 N, $g^p$ mod S, and $g^q$ mod S. The prover 12 and verifier 14 then perform 406, 408 the zkp_product protocol, described below, to demonstrate that N is the product of p and q without revealing any information about p and q.

The prover 12 then selects 410 four large prime factors p1, p2, p3 and p4 from each of the four quantities (p-1), (p+1), (q-1), and (q+1) respectively. The prover 12 then determines 410 four coefficients a1, a2, a3, and a4 such that a1×p1=(p-1), a2×p2=(p+1), a3×p3=(q-1),and a4×p4=(q+1). The prover 12 then publishes 414 $g^{p1}$ mod S, $g^{p2}$ mod S, $g^{p3}$ mod S, $g^{p4}$ mod S, $g^{a1}$ mod S, $g^{a2}$ mod S, $g^{a3}$ mod S, and $g^{a4}$ mod S. The quantities $g^{p+1}$ mod S, $g^{p-1}$ mod S, $g^{q+1}$ mod S, and $g^{q-1}$ mod S are readily computed 412 from the published values $g^p$ mod S, and $g^q$ mod S.

The prover 12 and the verifier 14 then perform 416, 418 the zkp_product protocol, described below, four times to demonstrate that a1×p1=(p-1), a2×p2=(p+1), a3×p3=(q-1), and a4×p4=(q+1), all without revealing any additional information about p1, p2, p3, p4, a1, a2, a3, a4, p or q.

The prover 12 and the verifier 14 then perform 420, 422 the zkp_prime protocol, described below, four times to demonstrate that p1, p2, p3, and p4 are prime, all without revealing any additional information about p1, p2, p3, or p4.

The prover 12 and the verifier 14 then perform 424, 426 the zkp_size protocol, described below, four times to demonstrate that p1, p2, p3, and p4 are larger than a specified security parameter, all without revealing any additional information about p1, p2, p3, or p4.

Demonstrating Resistance to Bach-Shallit Factoring Attacks

In one embodiment, a prover 12 has generated an RSA key pair and wishes to demonstrate its cryptographic strength to a verifier 14. The prover 12 wishes to demonstrate that the prime factors of N—p and q—are resistant to a Bach-Shallit attack, as described in E. Bach & J. Shallit, *Factoring with Cyclotomic Polynomials*, Math. Comp. 52 (1989), 201–219. Specifically, the prover 12 wishes to demonstrate that cyclotomic polynomials in p and q have large prime factors.

For the purposes of this invention, a very large prime number S, and a generator g of (Z/SZ)* are public information which are known by both the prover 12 and the verifier 14. In one embodiment, S and g are jointly generated by the prover 12 and the verifier 14.

Figure 5:
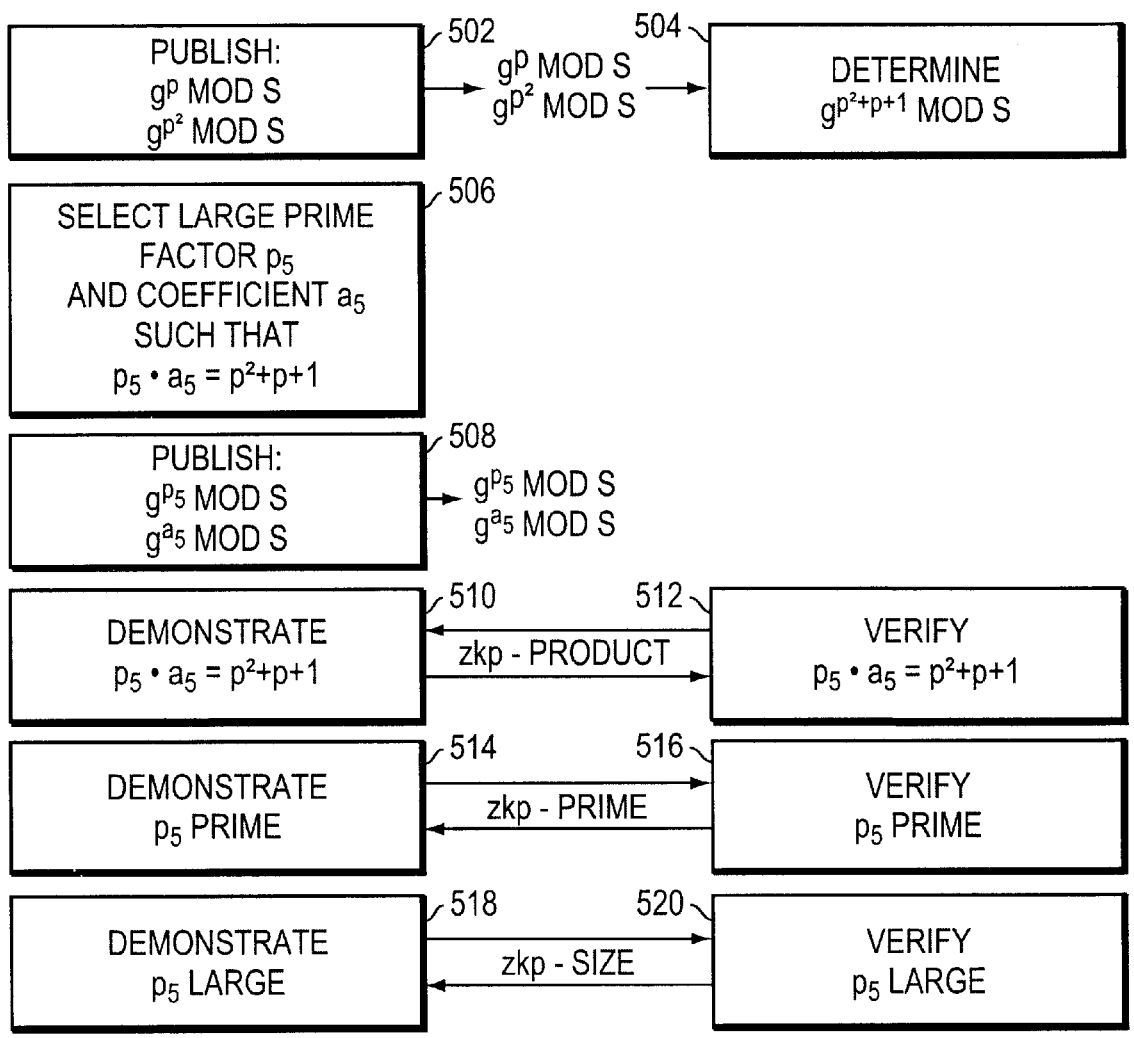
FIG. 5 is a flow chart illustrating a protocol for demonstrating that a number N is resistant to Bach-Shallit cyclotomic polynomial factoring attacks.

In one embodiment, illustrated in FIG. 5, the prover 12 wishes to demonstrate that the cyclotomic polynomial $p^2+p+1$ has a large prime factor. The prover 12 publishes 502 $g^{p^2}$ mod S and $g^p$ mod S. The prover 12 also selects 506 a large prime factor p5 of the cyclotomic polynomial and calculates 506 a coefficient a5 such that a5×p5=$p^2$+p+1. The prover 12 then publishes 508 $g^{p5}$ mod S, and $g^{a5}$ mod S. The prover 12 and verifier 14 then perform 510, 512 the zkp_product protocol, described below, to demonstrate that a5×p5=$p^2$+p+1, without revealing any information about p5, a5, or p.

The prover 12 and the verifier 14 then perform 514, 516 the zkp_prime protocol, described below, to demonstrate that p5 is prime without revealing any additional information about p5.

The prover 12 and the verifier 14 then perform 518, 520 the zkp_size protocol, described below, to demonstrate that p5 is larger than a specified security parameter without revealing any additional information about p5.

This technique can be extended to other cyclotomic polynomials, including, but not limited to, $p^2+1$, $p^4+p^3+p^2+p+1$, $p^2-p+1$, $p^6+p^5+p^4+p^3+p^2+p+1$, and $p^4+1$. This technique can also be applied to cyclotomic polynomials in q.

Demonstrating Resistance to Weighted Difference of Squares Attacks

In one embodiment, a prover 12 wishes to demonstrate that a private key is resistant to weighted difference of squares attacks. The weighted difference of squares attack is predicated on the property that if p and q are too close together, then N may be easily factored by representing it as $x^2 - y^2$.

Figure 6:
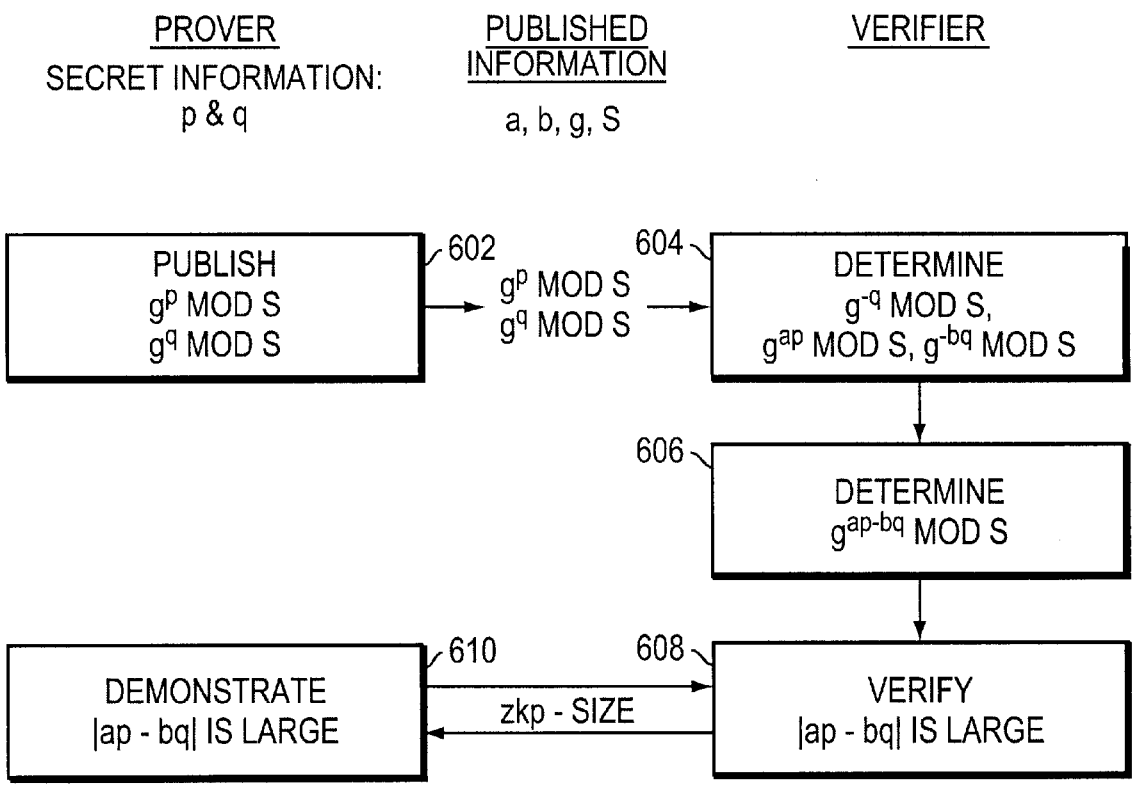
FIG. 6 is a flow chart illustrating a protocol for demonstrating that a number N is resistant to weighted difference of squares factoring attacks.

In one embodiment, a prover 12 publishes $g^p$ mod S, $g^p$ mod S, and two reasonably small integers, a and b. In an alternate embodiment, the verifier 14 publishes a and b. In yet another embodiment, illustrated in FIG. 6, the prover 12 and verifier 14 agree on a and b before starting the protocol.

The verifier 14 then calculates 604 $g^{-q}$ mod S via the Euclidean Algorithm. The verifier 14 also calculates 604 $g^{ap}$ mod S, $g^{-bq}$ mod S, and thus $g^{ap-bq}$ mod S. The prover 12 and verifier 14 then conduct 608, 610 a zkp_size protocol to demonstrate that the magnitude of ap-bq is large.

The Multi-Prime Protocol

If $N = \prod_{i=0}^{n-1} p_i$, for n a known fixed number, there is an extension of this protocol that proves that each of the prime factors $p_i$ are less than $N^{1/n+\epsilon}$. In the two prime case, we have $\phi(N)=N-p-q+1$, but in the general case, this becomes more complicated. Provided the $p_i$ are distinct, we get $$\phi(N) = \prod_{i=0}^{n-1} (p_i - 1) \qquad \text{(Equation 1)}$$

Which yields $$\phi(N) = N + (-1)^n - \sum_{i=0}^{n-1} N/p_i + M \quad \text{(Equation 2)}$$

where M is the sum of all the lower nonconstant terms in the expansion of the polynomial given in Equation 1. M is not necessarily divisible by n, but nonetheless, M can be divided into n nearly equal parts $\{M_0, \ldots M_{n-1}\}$.

The prover 12 and the verifier 14 either jointly agree on a base $2 \leq r \leq N-2$ or the verifier 14 selects one and sends it to the prover 12. Then, the prover 12 generates random variables $k_i$ for each i from 0 to k−1. In one embodiment the random variables $k_i$ are drawn from a uniform distribution. In a further embodiment, the uniform distribution has a minimum of zero and a maximum of $N^{1/k+\epsilon}$. The prover 12 then publishes $$k = \sum k_i \text{ and } r^{k_i+N/p_i+M_i}$$

for each i.

The verifier 14 then confirms that $$\prod_{i=0}^{n-1} r^{k_i+N/p_i+M_i} = r^{N+(-1)^k}$$

and chooses i at random in $0 \leq i \leq n-1$, and transmits i to the prover 12.

The prover 12 then publishes $k_j+N/p_j+M_j$ for each $j \neq i$.

The verifier 14 verifies that the previously given $r^{k_j+N/p_j+M_j}$ is correct and that $N^{(k-1)/k} < k_j + N/p_j + M_j < N^{(k-1)/k+\epsilon}$.

In an illustrative embodiment, n=3, with N=stu. In this embodiment, the prover 12 computes $k_1+k_2+k_3=k$, and sends $r^{st-u+k_1}$ $r^{su-t+k_2}$ and $r^{tu-s+k_3}$ to the verifier 14. The verifier 14 checks that their product is $r^{N-1}$ and randomly demands any two of the exponents back, checking that they are less than $2N^{1/3}+\epsilon$ where $\epsilon$ is a small number relative to 1.

Demonstrating that a Number is Greater than a Minimum Size

In one embodiment of the invention, a prover 12 wishes to demonstrate that a number is larger than a minimum size. For the purposes of this invention, a protocol that demonstrates the size of a number is referred to herein as a zkp_size protocol.

In one embodiment, the prover 12 wishes to demonstrate that a discrete logarithm key is large. Specifically, the prover 12 wishes to demonstrate that a quantity m is larger than a quantity $p^a$. The prover 12 publishes p, a quantity $P_1$, and a quantity $P_2$, wherein $P_2=P_1^m$ mod p. The verifier 14 then generates and publishes a random variable k. In a preferred embodiment, k is in the range $p^a/2 \leq k \leq p^a$. The prover 12 then randomly generates k1 and k2 such that k1+k2=k and publishes $P_1^{k1+m}$ and $P_1^{k2}$. The verifier 14 then checks that $P_1^{k1+m} \times P_1^{k2} = P_2 P_1^k$ and randomly requests either k1+m or k2. The prover 12 then publishes either k1+m or k2, depending on which was requested. The verifier 14 then checks that the returned value is in accord with the earlier sent value $P_1^{k1+m}$ or $P_1^{k2}$, and that either k1+m>$p^a$ or k2>0.

In an alternative embodiment, the prover 12 wishes to demonstrate that an elliptic curve discrete logarithm key is large. Specifically, given an elliptic curve E over the field Z/pZ, the prover 12 wishes to demonstrate that a quantity m is larger than a quantity $p^a$. The prover 12 publishes p, a quantity $P_1$, and a quantity $P_2$, wherein $P_2=mP_1$. The verifier 14 then generates and publishes a random variable k. In a preferred embodiment, k is in the range $p^a/2 \leq k \leq p^a$. The prover 12 then randomly generates k1 and k2 such that k1+k2=k and publishes (k1+m)$P_1$ and (k2)$P_1$. The verifier 14 then checks that (k1+m)$P_1$+(k2)$P_1$=$P_2$+k$P_1$ and randomly requests either k1+m or k2. The prover 12 then publishes either k1+m or k2, depending on which was requested. The verifier 14 then checks that the returned value is in accord with the earlier sent value (k1+m) $P_1$ or (k2)$P_1$, and that either k1+m>$p^a$ or k2>0.

In another alternative embodiment, the prover 12 demonstrates the bounds of the size of a given $g^a$ mod S as described in Damgard, *Practical and Provably Secure Release of a Secret and Exchange of Signatures*, Advances in Cryptology—Eurocrypt '93 LNCS 765 (1993), 200–217.

Mao's zkp_product Protocol

In one embodiment, a prover 12 wishes to demonstrate from public information $g^a$ mod S, $g^b$ mod S, and $g^c$ mod S that c=ab. A protocol that demonstrates such a property is referred to herein as a zkp_product protocol. A zkp_product protocol is given in Mao, *Verifiable Partial Sharing of the Factors of an Integer*, Proceedings of the SAC '98, Queen's University 95–109.

In this protocol, the prover 12 generates a large prime number P and a prime quantity Q, such that $$Q = \frac{(P-1)}{2}.$$

The prover 12 then selects a base f such that $0 \leq f < P$ and publishes f, $f^p$, $f^q$, $f^N$, P, and the bit lengths of p, q, and N.

The prover 12 then demonstrates that $\log_f(f^p) \bmod P = \log_{f^q}(f^{pq}) \bmod P$, and $\log_f(f^q) \bmod P = \log_{f^p}(f^{pq}) \bmod P$. In a preferred embodiment, these properties are demonstrated by the prover 12 and verifier 14 performing the Chaum-Pedersen protocol, as described in Chaum, D. and Pedersen, T. P., Wallet databases with observers, Advances in Cryptology—Proceedings of CRYPTO '92 (LNCS 740), pages 89–105, Springer-Verlag, 1993.

Finally, the prover 12 demonstrates that the bit length of N is greater than or equal to the sum of the bit lengths of p and q, and less than the bit length of Q−2. In a preferred embodiment, these properties are demonstrated by the prover 12 and verifier 14 engaging in a zkp_size protocol.

Gennero, Micciancio & Rabin Protocol

In one embodiment, a prover 12 wishes to demonstrate that a quantity N is the product of exactly two prime factors without revealing any other information about these factors. One method of demonstrating that a quantity N is the product of exactly two prime factors is described in R. Gennaro, D. Micciancio, & T. Rabin, *An Efficient, Non-Interactive Statistical Zero-Knowledge Proof System for Quasi-Safe Prime Products*, preprint.

In one embodiment, a prover 12 demonstrates that a quantity N is the product of exactly two prime factors in three steps. In the first step, the prover 12 demonstrates that N is square-free, that is, there is no m>1 such that $m^2$ divides N. In the second step, the prover 12 demonstrates that N is a prime power product, that is, N has at most two distinct prime factors. In the third and final step, the prover 12 demonstrates that N is a disjoint prime product, that is, N is the product of two prime numbers P and Q such that (P−1) and (Q−1) have no odd common factors.

In one embodiment, a prover 12 demonstrates that a quantity N is square-free according to the following protocol. The prover 12 publishes N. Next a random number x is determined and published. In one embodiment, the verifier 14 determines x. In an alternate embodiment, the prover 12 and verifier 14 agree on an x. In one embodiment x is chosen from the set of integers from zero to N. The prover 12 then determines M such that $M=N^{-1} \mod \phi(N)$, where $\phi(N)$ is the Euler totient function. The prover 12 next determines and publishes y such that $y=x^M \mod N$. The verifier 14 then verifies that $y^N = x \mod N$.

In one embodiment, a prover 12 demonstrates that a quantity N is a prime power product according to the following protocol. The prover 12 publishes N. Next a random number x is determined and published. In one embodiment, the verifier 14 determines x. In an alternate embodiment, the prover 12 and verifier 14 agree on an x. In one embodiment x is chosen from the set of integers from zero to N. The prover 12 then determines and publishes a root r, where r is selected from a group consisting of: $\sqrt{x} \mod N$, $-\sqrt{x} \mod N$, $\sqrt{2x} \mod N$, and $-\sqrt{2x} \mod N$. The verifier 14 then verifies that $r^2$ is congruent to $\pm x$ or $\pm 2x$ modulo N.

In one embodiment, a prover 12 demonstrates that a quantity N is a disjoint prime product according to the following protocol. The prover 12 publishes N. Next a random number x is determined and published. In one embodiment, the verifier 14 determines x. In an alternate embodiment, the prover 12 and verifier 14 agree on an x. In one embodiment x is chosen from the set of integers from zero to N. The prover 12 then determines M, such that M is the inverse of $odd(N-1)^{-1} \mod \phi(N)$, where the function $odd(N-1)$ is the greatest odd number that divides $(N-1)$ and the function $\phi(N)$ is the Euler totient function. The prover 12 then determines and publishes y, such that $y=x^M \mod N$. The verifier 14 then verifies that N is not a Fermat prime, and that $y^{odd(N-1)} = x \mod N$.

Security Parameters

The protocols in several embodiments of this invention demonstrate that elements of a key pair are large enough to be considered secure. In general, an element is considered large relative to a security parameter if it is large enough to render factoring attacks infeasible. For example, the ANSI X9.31 and X9.44 standards require the size of factors of $p\pm 1$ and $q\pm 1$ to be greater than $2^{100}$. The standards further require the magnitude of the difference between 512-bit factors be greater than $2^{412}$. However, the protocols and systems of this invention do not require a fixed security parameter.

In one embodiment, the security parameter can be agreed upon by the prover 12 and verifier 14 before executing a protocol according to the parties' desired level of security, as well as the current state of the cryptanalytic art and available computing power. In another embodiment, the verifier 14 sets the security parameter to a desired level for the prover 12 to demonstrate. In a further embodiment, the verifier 14 sets the security parameter based on the amount of liability the verifier 14 assumes for certifying the cryptographic security of a prover 12's key pair.

Prove_prime Protocol

In one embodiment, a number p is shown to be prime without revealing p using a protocol designated the prove_prime protocol. In this protocol, a prover 12 generates another prime q such that N=pq is too difficult to factor, and jointly proves that p and q are prime.

Having generated q, the prover 12 publishes $g^p \mod S$, $g^q \mod S$, and N. In one embodiment, the prover 12 and verifier 14 then jointly execute the Disjoint Prime Protocol disclosed in R. Gennaro, D. Micciancio, & T. Rabin, *An Efficient, Non-Interactive Statistical Zero-Knowledge Proof System for Quasi-Safe Prime Products*, preprint. In an alternate embodiment, the prover 12 and verifier engage in the two_large_prime_factors protocol taught above for demonstrating that N is the product of two large primes.

Hardware

In one embodiment, electronic hardware is employed to perform the protocols described above. In one embodiment, the hardware performing these protocols comprises a number generator. In one embodiment, the number generator is a pseudo-random number generator. In an alternate embodiment, the number generator is a random number generator. In a further embodiment, the random number generator measures entropy for its input. In yet a further embodiment, the random number generator measures the space between a user's keystrokes as a source of entropy. In an alternate embodiment, the random number generator measures radioactive decay as a source of entropy.

In one embodiment, the hardware performing these protocols further comprises a transmitter for sending information from one device to another device. In a further embodiment, this transmitter is a component of a standard PC network interface card connecting a general purpose computer to a computer network. In a further embodiment, the computer network is an Ethernet network. In an alternate embodiment, the transmitter is a radio frequency transmitter. In yet another alternate embodiment, the transmitter is an infrared transmitter. In yet another alternate embodiment, the transmitter comprises the interface hardware on a smartcard.

In one embodiment, the hardware performing these protocols further comprises a receiver for a device to obtain information from another device. In a further embodiment, this receiver is a component of a standard PC network interface card connecting a general purpose computer to a computer network. In a further embodiment, the computer network is an Ethernet network. In an alternate embodiment, the receiver is an antenna for receiving radio frequency signals. In yet another alternate embodiment, the receiver is an infrared sensor. In yet another alternate embodiment, the receiver comprises the interface hardware on a smartcard.

In one embodiment, the hardware performing these protocols further comprises modules for performing mathematical operations. In a further embodiment, the hardware comprises modules for performing basic arithmetic such as addition, subtraction, multiplication, and division. In another further embodiment, the hardware comprises a module for performing modulo arithmetic. In another further embodiment, the hardware comprises a module for performing exponentiation. In one embodiment, these modules are interconnected so that the hardware is capable of performing mathematical functions that employ combinations of these modules.

In one embodiment, the hardware performing these protocols further comprises modules for comparing quantities. In a further embodiment, the hardware comprises a comparison module for determining whether two quantities are equal. In a further embodiment, the hardware comprises a comparison module for determining whether one quantity is greater than or less than another quantity.

Equivalents

The protocols described in the above examples are directed to demonstrate the cryptographic strength of RSA key pairs, but they may also be used to demonstrate the cryptographic strength of key pairs in other public key cryptography systems.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method for a proving entity to demonstrate to a verifying entity the cryptographic security of a private key and a public key, wherein said keys comprise n prime numbers $p_i$, wherein said i is an index variable ranging from 1 to n, the method comprising the steps of:

(a) determining, by said verifying entity, that a product N is the product of exactly n primes, wherein said product N is the product of said prime numbers $p_i$;

(b) selecting a base r, wherein said base r is an element of a first distribution;

(c) selecting, by said proving entity, a plurality of n blinding random numbers $k_i$, wherein said blinding random numbers $k_i$ are members of a second distribution;

(d) publishing, by said proving entity, a plurality of n commitment numbers $h_i$, each of said commitment numbers $h_i$ comprising said base r raised to an exponent $E_i$;

(e) publishing, by said proving entity, a sum k, said sum k equal to the sum of said plurality of blinding random numbers $k_i$;

(f) determining, by said verifying entity, that the product of said plurality of commitment numbers $h_i$ equals a verification number X;

(g) determining, by said verifying entity, that said sum k is less than n times the largest element in said second distribution;

(h) publishing, by said verifying entity, a selection indicating an exponent selected from the group consisting of said plurality of exponents $E_i$;

(i) publishing, by said proving entity, all of said plurality of exponents $E_i$ except said selected exponent;

(j) determining, by said verifying entity, that the value of said base r raised to an exponent $E_i$ equals a commitment number $h_i$; and (k) determining, by said verifying entity, that an exponent $E_i$ is greater than or equal to a lower bound and less than or equal to an upper bound.

2. The method of claim 1 wherein said base r is jointly agreed upon by said verifying entity and said proving entity.

3. The method of claim 1 wherein said base r is generated by said verifying entity.

4. The method of claim 1 wherein said determining step (a) is performed according to the Gennaro, Micciancio, and Rabin protocol.

5. The method of claim 1 wherein said first distribution is a uniform distribution.

6. The method of claim 5 wherein said uniform distribution includes elements greater than or equal to 2 and less than or equal to N−1.

7. The method of claim 1 wherein said second distribution is a uniform distribution.

8. The method of claim 7 wherein said uniform distribution includes elements greater than or equal to 0 and less than or equal to $N^{1/n+\epsilon}$, wherein said $\epsilon$ is a very small positive number relative to 1.

9. The method of claim 1 wherein said wherein said exponent $E_i$ comprises the sum $k_i+p_i+M_i$ said $M_i$ comprising an n-way partitioning of lower order terms in the expansion of the Euler totient function of N.

10. The method of claim 1 wherein said verification number X is equal to $r^{N+(-1)^{n+k}}$.

11. A method for a proving entity to demonstrate to a verifying entity the cryptographic security of a private key and a public key, wherein said keys comprise n prime numbers $p_i$, wherein said i is an index variable ranging from 1 to n, the method comprising the steps of:

(a) selecting n blinding random numbers $k_i$, wherein said blinding random numbers $k_i$ are members of a first distribution;

(b) publishing a plurality of n commitment numbers $h_i$ said commitment numbers comprising a base r raised to a plurality of exponents $E_i$;

(c) publishing the sum k, wherein said sum k equals the sum of said plurality of blinding random numbers $k_i$;

(d) receiving a selection from said verifying entity, said selection indicating an exponent selected from the group consisting of said plurality of exponents $E_i$; and (e) publishing all of said plurality of exponents $E_i$ except said selected exponent.

12. The method of claim 11 wherein said plurality of exponents $E_i$ comprise said plurality of blinding random numbers $k_i$ and said plurality of prime numbers $p_i$.

13. The method of claim 11 wherein said base r is an element of a second distribution, wherein said second distribution is a uniform distribution.

14. The method of claim 13 wherein said second distribution includes elements greater than or equal to 2 and less than or equal to N−1.

15. The method of claim 11 wherein said first distribution is a uniform distribution.

16. The method of claim 15 wherein said first distribution includes elements greater than or equal to 0 and less than or equal to $N^{1/n+\epsilon}$, wherein said $\epsilon$ is a very small positive number relative to 1.

17. The method of claim 11 wherein said wherein each of said plurality of exponents $E_i$ comprises the sum $k_i+p_i+M_i$, said $M_i$ comprising an n-way partitioning of lower order terms in the expansion of the Euler totient function of N, wherein said r is a random variable selected from a second distribution, wherein said N is the product of said plurality of prime numbers $p_i$.

18. A method for a verifying entity to verify the cryptographic security of a private key and a public key, wherein said keys comprise n prime numbers $p_i$, wherein said i is an index variable ranging from 1 to n, the method comprising the steps of:

(a) obtaining a product N, wherein said product N is the product of said n prime numbers $p_i$;

(b) verifying that said product N is the product of exactly n primes;

(c) selecting a base r, wherein said base r is an element of a first distribution;

(d) receiving from said proving entity a plurality of n commitment numbers $h_1$ comprising said base r raised to a plurality of n exponents $E_i$;

(e) receiving from said proving entity a sum k, wherein said sum k is the sum of a plurality of n blinding random numbers $k_i$, wherein said blinding random numbers $k_i$ are selected from a second distribution;

(f) verifying that the product of said plurality of commitment numbers $h_i$ equals a verification number X;

(g) verifying that said k is less than n times the largest element in said second distribution;

(h) publishing a selection indicating an exponent selected from the group consisting of said plurality of exponents $E_i$;

(i) receiving from said proving entity all of said plurality of exponents $E_i$ except said selected exponent;

(j) verifying that the value of said base r raised to each of said plurality of exponents $E_i$ equals said plurality of commitment numbers $h_i$; and (k) verifying that each of said plurality of exponents $E_i$ is greater than or equal to a lower bound and less than or equal to an upper bound.

19. The method of claim 18 wherein said verification step (b) is performed according to the Gennaro, Micciancio, and Rabin protocol.

20. The method of claim 18 wherein said first distribution is a uniform distribution.

21. The method of claim 18 wherein said uniform distribution includes elements greater than or equal to 2 and less than or equal to N−1.

22. The method of claim 18 wherein said verification number X is equal to $r^{N+(-1)^{n+k}}$.

23. A method for a proving entity to demonstrate to a verifying entity the cryptographic security of a private key and a public key, wherein said keys comprise a plurality of n prime numbers $p_i$, wherein said i is an index variable ranging from 1 to n, the method comprising the steps of:

(a) selecting a base r, wherein said base r is an element of a first distribution;

(b) selecting, by said proving entity, a blinding random number k, wherein said blinding random number k is an element of a second distribution;

(c) publishing, by said proving entity, a quantity $r^k$ mod N, wherein said N is the product of said plurality of n prime numbers $p_i$;

(d) publishing, by said verifying entity, a random variable m, wherein said random variable m is an element of a third distribution;

(e) publishing, by said proving entity, an exponent E, wherein said exponent E is equal to the sum of said plurality of prime factors $p_i$ plus a product mk;

(f) verifying, by said verifying entity, that the quantity $r^E$ equals the quantity $r^{N+1}(r^k)^m$ mod N; and (g) verifying, by said verifying entity, that said exponent E is greater than a lower bound and less than an upper bound.

24. The method of claim 23 wherein said base r is jointly agreed upon by said verifying entity and said proving entity.

25. The method of claim 23 wherein said base r generated by said verifying entity.

26. The method of claim 23 wherein said first distribution is a uniform distribution.

27. The method of claim 26 wherein said uniform distribution includes elements greater than or equal to 2 and less than or equal to N−1.

28. The method of claim 23 wherein said second distribution is a uniform distribution.

29. The method of claim 18 wherein said uniform distribution includes elements greater than or equal to 0 and less than or equal to $N^{1/2n-\epsilon}$, wherein said $\epsilon$ is a very small positive number relative to 1.

30. The method of claim 23 wherein said third distribution is a uniform distribution.

31. The method of claim 30 wherein said uniform distribution includes elements greater than or equal to 0 and less than or equal to $N^{1/2n-\epsilon}$, wherein said $\epsilon$ is a very small positive number relative to 1.

32. The method of claim 23 wherein said lower bound comprises zero and said upper bound comprises the quantity $nN^{1/n+n\epsilon}$, wherein said $\epsilon$ is a very small positive number relative to 1.

33. A method for a proving entity to demonstrate to a verifying entity the cryptographic security of a private key and a public key, wherein said keys comprise a plurality of n prime numbers $p_i$, wherein said i is an index variable ranging from 1 to n, the method comprising the steps of:

(a) selecting, by said proving entity, a blinding random number k, wherein said blinding random number k is an element of a second distribution;

(b) publishing, by said proving entity, a quantity $r^k$ mod N, wherein said N is the product of said n prime numbers $p_i$, wherein said base r is a random variable, wherein said base r is further an element of a first distribution; and (c) publishing, by said proving entity, an exponent E, wherein said exponent E is equal to the sum of said plurality of prime factors $p_i$ plus a product mk, wherein said m is a random variable, wherein said m is further an element of a third distribution.

34. The method of claim 33 wherein said first distribution is a uniform distribution.

35. The method of claim 34 wherein said uniform distribution includes elements greater than or equal to 2 and less than or equal to N−1.

36. The method of claim 33 wherein said second distribution is a uniform distribution.

37. The method of claim 36 wherein said uniform distribution includes elements greater than or equal to 0 and less than or equal to $N^{1/2n-\epsilon}$, wherein said $\epsilon$ is a very small positive number relative to 1.

38. A method for a verifying entity to determine the cryptographic security of a private key and a public key, wherein said keys comprise n prime numbers $p_i$, wherein said i is an index variable ranging from 1 to n, the method comprising the steps of:

(a) selecting a base r, wherein said base r is an element of a first distribution;

(b) receiving, by said verifying entity, a quantity $r^k$ mod N from a proving entity, wherein said N is the product of said n prime numbers $p_i$, and wherein said k is a blinding random number, and wherein said k is further an element of a second distribution;

(d) publishing, by said verifying entity, a random variable m, wherein said random variable m is an element of a third distribution;

(e) receiving, by said verifying entity, an exponent E from said proving entity, wherein said exponent E is equal to the sum of said plurality of prime factors $p_i$ plus a product mk;

(f) verifying, by said verifying entity, that a quantity $r^E$ equals a quantity $r^{N+1}(r^k)^m$ mod N; and (g) verifying, by said verifying entity, that said exponent E is greater than a lower bound and less than an upper bound.

39. The method of claim 38 wherein said base r is jointly agreed upon by said verifying entity and said proving entity.

40. The method of claim 38 wherein said random variable r is generated by said verifying entity.

41. The method of claim 38 wherein said first distribution is a uniform distribution.

42. The method of claim 41 wherein said uniform distribution includes elements greater than or equal to 2 and less than or equal to N−1.

43. The method of claim 38 wherein said third distribution is a uniform distribution.

44. The method of claim 43 wherein said uniform distribution includes elements greater than or equal to 0 and less than or equal to $N^{1/2n+\epsilon}$, wherein said $\epsilon$ is a very small positive number relative to 1.

45. The method of claim 38 wherein said lower bound comprises zero and said upper bound comprises the quantity $nN^{1/n}+n\epsilon$, wherein said $\epsilon$ is a very small positive number relative to 1.

46. A system for demonstrating the cryptographic security of a private key and a public key, wherein said keys comprise n prime numbers $p_i$, wherein said i is an index variable ranging from 1 to n, said system comprising a proving device and a verifying device, wherein said system further comprises:

(a) a first random variable generator for selecting a base r, wherein said base r is an element of a first distribution; said proving device comprising:

(b) a transmitter sending a product N to said verifying device, said product N comprising the product of said n prime numbers $p_i$;

(c) a second random variable generator for selecting n random variables $k_i$, wherein said n random variables $k_i$ are members of a second distribution;

(d) a transmitter sending a plurality of commitment numbers $h_i$ to said verifying device each of said commitment numbers comprising said base r raised to an exponent $E_i$;

(e) a transmitter sending a sum k to said verifying device, said sum k equal to the sum of said n random variables $k_i$; and (f) a transmitter sending said plurality of exponents $E_i$ except for a selected exponent to said verifying device; and said verifying device comprising:

(g) an analyzer for determining that said product N is the product of exactly n primes;

(h) an analyzer for determining that the product of said plurality of commitment numbers $h_i$ equals a verification number $Xr^{N+(-1)^n+k}$ mod N;

(i) an analyzer for determining that said sum k is less than n times the largest element in said second distribution;

(j) a transmitter sending a selection to said proving device indicating an selected from the group consisting of said plurality of exponents $E_i$;

(k) an analyzer for determining that the value of each of said plurality of n commitment numbers $h_i$ is equal to said base r raised to said exponent $E_i$; and (l) an analyzer for determining that said plurality of exponents $E_i$ is greater than or equal to a lower bound and less than or equal to an upper bound.

47. The system of claim 46 wherein said base r is jointly generated by said verifying device and said proving device.

48. The system of claim 46 wherein said base r is generated by said verifying device.

49. The system of claim 46 wherein said analyzer (g) executes the Gennaro, Micciancio, and Rabin protocol.

50. The system of claim 46 wherein said irst distribution is a uniform distribution.

51. The system of claim 50 wherein said uniform distribution includes elements greater than or equal to 2 and less than or equal to N−1.

52. The system of claim 46 wherein said second distribution is a uniform distribution.

53. The system of claim 52 wherein said uniform distribution includes elements greater than or equal to 0 and less than or equal to $N^{1/n+\epsilon}$, wherein said $\epsilon$ is a very small positive number relative to 1.

54. The system of claim 46 wherein said lower bound comprises $N^{1/n}-\epsilon$, and said upper bound comprises $nN^{1/n+\epsilon}$, wherein said $\epsilon$ is a very small positive number relative to 1.

55. The system of claim 46 wherein said exponent $E_i$ comprises the sum $k_i+p_i+M_i$, said $M_i$ comprising an n-way partitioning of lower order terms in the expansion of the Euler totient function of N.

56. The system of claim 46 wherein said verification number X equals $r^{N+(-1)^{n+k}}$ mod N.

57. A proving device to demonstrate to a verifying device the cryptographic security of a private key and a public key, wherein said keys comprise n prime numbers $p_i$, wherein said i is an index variable ranging from 1 to n, said proving device comprising:

(a) a second random variable generator for selecting a plurality of n blinding numbers $k_i$, wherein said plurality of n blinding numbers $k_i$ are members of a first distribution;

(b) a transmitter sending to said verifying device a plurality of n commitment numbers $h_i$, each of said commitment numbers $h_i$ comprising a base r raised to an exponent $E_i$;

(c) a transmitter sending to said verifying device a sum k, wherein said sum k equals the sum of said plurality of n blinding numbers $k_i$;

(d) a receiver for receiving a selection from said verifying device indicating an exponent selected from said plurality of n exponents $E_i$; and (e) a transmitter sending to said verifying device all of said plurality of exponents Ei except said selected exponent.

58. The proving device of claim 57 wherein said exponent $E_i$ comprises the sum $k_i+p_i+M_i$, said $M_i$ comprising an n-way partitioning of lower order terms in the expansion of the Euler totient function of N.

59. The proving device of claim 57 wherein said base r is an element of a second distribution, wherein said second distribution is a uniform distribution.

60. The proving device of claim 59 wherein said second distribution includes elements greater than or equal to 2 and less than or equal to N−1.

61. The proving device of claim 57 wherein said first distribution is a uniform distribution.

62. The proving device of claim 61 wherein said first distribution includes elements greater than or equal to 0 and less than or equal to $N^{1/n}+\epsilon$, wherein said $\epsilon$ is a very small positive number relative to 1.

63. A verifying device for determining the cryptographic security of a private key and a public key, wherein said keys comprise a plurality of n prime numbers $p_i$, wherein said i is an index variable ranging from 1 to n, said verifying device comprising:

(a) a receiver for receiving a product N, wherein said product N is the product of said plurality of n prime numbers $p_i$;

(b) an analyzer to determine that said N is the product of exactly n primes;

(c) a first random variable generator for selecting a base r, wherein said base r is an element of a first distribution;

(d) a receiver for receiving from a proving device a plurality of n commitment numbers $h_i$, each of said commitment numbers $h_i$ comprising a base r raised to an exponent $E_i$;

(e) a receiver for receiving from said proving device a sum k, wherein said sum k is the sum of a plurality of n blinding numbers $k_i$, wherein said plurality of n blinding numbers $k_i$ are random variables selected from a second distribution;

(f) an analyzer to determine that the product of said plurality of n commitment numbers $h_i$ equals a verification number X;

(g) an analyzer to determine that said k is less than n times the largest element in said second distribution;

(h) a transmitter sending to said proving device a selection indicating an exponent selected from the group consisting of said plurality of exponents $E_i$;

(i) a receiver for receiving from said proving device all of said plurality of exponents $E_i$ except said selected exponent;

(j) an analyzer to determine that the value of each of said plurality of n commitment numbers $h_i$ is equal to said base r raised to said exponent $E_i$; and (k) an analyzer to determine that said plurality of exponents $E_i$ is greater than or equal to a lower bound and less than or equal to an upper bound.

64. The verifying device of claim 63 wherein said analyzer (b) executes the Gennaro, Micciancio, and Rabin protocol.

65. The verifying device of claim 63 wherein said first distribution is a uniform distribution.

66. The verifying device of claim 65 wherein said uniform distribution includes elements greater than or equal to 2 and less than or equal to N−1.

67. The verifying device of claim 63 wherein said verification number X equals $r^{N+(-1)^n+k}$ mod N.

68. A system for demonstrating the cryptographic security of a private key and a public key, wherein said keys comprise n prime numbers $p_i$, wherein said i is an index variable ranging from 1 to n, said system comprising a proving device and a verifying device, wherein said system further comprises:

(a) a first random variable generator for selecting a base r, wherein said base r is an element of a first distribution; said proving device comprising:

(b) a second random variable generator for selecting a blinding random number k, wherein said blinding random number k is an element of a second distribution;

(c) a transmitter sending a quantity $r^k$ mod N to said verifying device, wherein said N is the product of said n prime numbers $p_i$;

(d) a transmitter sending an exponent E to said verifying device, wherein said exponent E is equal to the sum of said plurality of prime factors $p_i$ plus a product mk, wherein said m is a random variable, wherein said m is further an element of a third distribution;

said verifying device comprising:

(e) a transmitter sending a quantity m to said proving device;

(f) an analyzer for determining that the quantity $r^E$ equals the quantity $r^{N+1}(r^k)^m$ mod N; and (g) an analyzer for determining that said exponent E is greater than a lower bound and less than an upper bound.

69. The system of claim 68 wherein said base r is jointly generated by said verifying device and said proving device.

70. The system of claim 68 wherein said base r generated by said verifying device.

71. The system of claim 68 wherein said first distribution is a uniform distribution.

72. The system of claim 71 wherein said uniform distribution includes elements greater than or equal to 2 and less than or equal to N−1.

73. The system of claim 68 wherein said second distribution is a uniform distribution.

74. The system of claim 73 wherein said uniform distribution includes elements greater than or equal to 0 and less than or equal to $N^{1/2n+\epsilon}$, wherein said $\epsilon$ is a very small positive number relative to 1.

75. The system of claim 68 wherein said third distribution is a uniform distribution.

76. The system of claim 75 wherein said uniform distribution includes elements greater than or equal to 0 and less than or equal to $N^{1/2n+\epsilon}$, wherein said $\epsilon$ is a very small positive number relative to 1.

77. The system of claim 68 wherein said lower bound comprises zero and said upper bound comprises the quantity $nN^{1/n+n\epsilon}$, wherein said $\epsilon$ is a very small positive number relative to 1.

78. A proving device demonstrating the cryptographic security a private key and a public key to a verifying device, wherein said keys comprise n prime numbers $p_i$, wherein said i is an index variable ranging from 1 to n, the proving device comprising:

(a) a second random variable generator for selecting a blinding random number k, wherein said blinding random number k is an element of a second distribution;

(b) a transmitter sending the quantity $r^k$ mod N to said verifying device, wherein said N is the product of said n prime numbers $p_i$, wherein said base r is a random variable, wherein said base r is further an element of a first distribution; and (c) a transmitter sending an exponent E to said verifying device, wherein said exponent E is equal to the sum of said plurality of prime factors $p_i$ plus a product mk, wherein said m is a random variable, wherein said m is further an element of a third distribution.

79. The proving device of claim 78 wherein said first distribution is a uniform distribution.

80. The proving device of claim 79 wherein said uniform distribution includes elements greater than or equal to 2 and less than or equal to N−1.

81. The proving device of claim 78 wherein said second distribution is a uniform distribution.

82. The proving device of claim 81 wherein said uniform distribution includes elements greater than or equal to 0 and less than or equal to $N^{1/2n+\epsilon}$, wherein said $\epsilon$ is a very small positive number relative to 1.

83. A verifying device to determine the cryptographic security of a private key and a public key, wherein said keys comprise n prime numbers $p_i$, wherein said i is an index variable ranging from 1 to n, the verifying device comprising:

(a) a first random variable generator for selecting a base r, wherein said base r is an element of a first distribution;

(b) a receiver obtaining the quantity $r^k$ mod N from a proving device, wherein said N is the product of said n prime numbers $p_i$, and wherein said k is a blinding random number, and wherein said k is further an element of a second distribution;

(d) a transmitter sending a random variable m to said proving device, wherein said random variable m is an element of a third distribution;

(e) a receiver obtaining an exponent E from said proving device;

(f) an analyzer to determine that the quantity $r^E$ equals the quantity $r^{N+l}(r^k)^m$ mod N; and (g) an analyzer to determine that said exponent E is greater than a lower bound and less than an upper bound.

84. The verifying device of claim 83 wherein said base r is jointly generated by said verifying device and said proving device.

85. The verifying device of claim 83 wherein said base r is generated by said verifying device.

86. The verifying device of claim 83 wherein said first distribution is a uniform distribution.

87. The verifying device of claim 86 wherein said uniform distribution includes elements greater than or equal to 2 and less than or equal to N−1.

88. The verifying device of claim 83 wherein said third distribution is a uniform distribution.

89. The verifying device of claim 88 wherein said uniform distribution includes elements greater than or equal to 0 and less than or equal to $N^{1/2n+\epsilon}$, wherein said $\epsilon$ is a very small positive number relative to 1.

90. The verifying device of claim 83 wherein said lower bound comprises zero and said upper bound comprises the quantity $nN^{1/n+\epsilon}$, wherein said $\epsilon$ is a very small positive number relative to 1.

* * * * *

UNITED STATES PATENT AND TRADEMARK OFFICE
CERTIFICATE OF CORRECTION

PATENT NO. : 6,411,715 B1
DATED : June 25, 2002
INVENTOR(S) : Liskov et al.

It is certified that error appears in the above-identified patent and that said Letters Patent is hereby corrected as shown below:

Column 16,
Line 2, delete "$r^{N+(-1)^{n+K}}$" and substitute the mathematical expression -- $r^{N+(-1)^n+k}$ -- therefor.

Column 17,
Line 17, delete "$r^{N+(-1)^{n+K}}$" and substitute the mathematical expression -- $r^{N+(-1)^n+k}$ -- therefor.

Line 56, delete "$N^{1/2n-\varepsilon}$" and substitute the mathematical expression -- $N^{1/2n-\varepsilon}$ -- therefor.

Line 63, delete "$N^{1/2n-\varepsilon}$" and substitute the mathematical expression -- $N^{1/2n-\varepsilon}$ -- therefor.

Column 18,
Line 28, delete "$N^{1/2n-\varepsilon}$" and substitute the mathematical expression -- $N^{1/2n+\varepsilon}$ -- therefor.

Column 19,
Line 1, delete "$N^{1/2n+\varepsilon}$" and substitute the mathematical expression -- $N^{1/2n+\varepsilon}$ -- therefor.

Line 5, delete "$nN^{1/n} + n\varepsilon$" and substitute the mathematical expression -- $nN^{1/n+n\varepsilon}$ -- therefor.

Line 53, delete "irst" and substitute the word -- first -- therefor.

Line 65, delete "$nN^{1/n} - \varepsilon$" and substitute the mathematical expression -- $N^{1/n-\varepsilon}$ -- therefor.

UNITED STATES PATENT AND TRADEMARK OFFICE
CERTIFICATE OF CORRECTION

PATENT NO. : 6,411,715 B1
DATED : June 25, 2002
INVENTOR(S) : Liskov et al.

It is certified that error appears in the above-identified patent and that said Letters Patent is hereby corrected as shown below:

<u>Column 20,</u>
Line 6, delete "$r^{N+(-1)^{n+k}}$" and substitute the mathematical expression -- $r^{N+(-1)^{n+k}} \mod N$ -- therefor.

Line 44, delete "$nN^{\frac{1}{n}} + \varepsilon$" and substitute the mathematical expression -- $N^{\frac{1}{n}+\varepsilon}$ -- therefor.

<u>Column 24,</u>
Line 8, delete "$N^{\frac{1}{2n}+\varepsilon}$" and substitute the mathematical expression -- $N^{\frac{1}{2n}+\varepsilon}$ -- therefor.

Line 12, delete "$nN^{\frac{1}{n}+\varepsilon}$" and substitute the mathematical expression -- $nN^{\frac{1}{n}+n\varepsilon}$ -- therefor.

Signed and Sealed this

Seventeenth Day of December, 2002

JAMES E. ROGAN
*Director of the United States Patent and Trademark Office*